A. Stedman.
Making Wooden Screws.
8,604x
Patented Jan. 16. 1835.
BEST AVAILABLE COPY
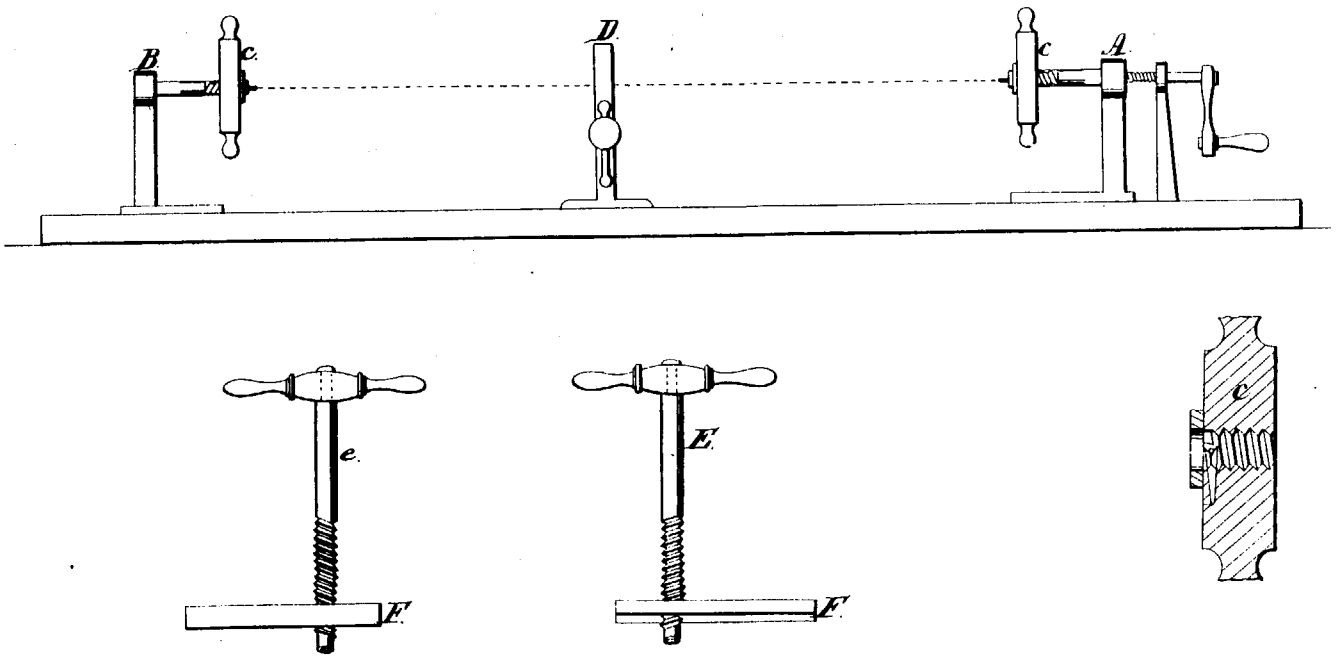
AM. PHOTO-LITHO. CO. N.Y. (OSBORNE'S PROCESS)

8604X Jan. 16. 1835

Aaron Stedman
Letters Patent

The Schedule referred to in these Letters Patent and making part of the same containing a description in the words of the said Aaron Stedman himself of his improvement in a Machine for making Bedsteads

---

To all to whom these presents shall come. Aaron Stedman of the town of Pittsford in the County of Monroe and State of New York sends greeting. Be it known that I the said Aaron Stedman have invented constructed and applied to use new & useful improvements in machine for making bed-steads called by me "a bedstead machine" and that the following is a full & exact description of the construction & operation of the said machine as invented or improved by me. The said machine is composed of two parts the one for cutting the screws in the side & end rails of the bedstead and the other for cutting the boxes or nuts in the posts of the bedsteads to receive the said screws. That part of the said machine for cutting the screws is composed of two upright stands called a head block and heel block about ten inches high, which may be fastened to a plank or piece of timber or a common work bench with holes or grooves at suitable distances so as to admit the side or end rails of bedsteads of different lengths. From the said upright standards and near the upper end are two screws one on each standard projecting towards each other with a centre pin in each the one a right hand and the other a left hand screw. To each screw is attached a screw tool with handles, Each screw tool including the handles is about eleven inches long. Each screw tool is exactly fitted to the screw and so constructed as to commence cutting the screw at each end of the rail at the same point. Upon the inner side of each screw tool is a thin cap to regulate the cutting of the screw describing about five eighths of a circle and even with the V or cutter which cap may be made of wood or any kind of metal and one eighth of an inch thick or thicker or thinner Upon the outside of each screw tool is another cap to keep the screw tool from wabbling which may be one inch thick or more. One of the standards or blocks is made move-able Jan. 16 1835

8604X able by means of a screw or otherwise in order to let in the rails between the
centre pins and to fasten the ends thereof. Between the two upright stand
ards or head block & heel block is a vice to hold the rails from turning
when cutting the screws. That part of the machine for cutting the boxes or nuts
in the posts to receive the screws is composed of two screw augers. a right
hand and a left hand auger which may be made of steel or cast iron. When
made of cast iron a steel cutter is dovetailed into each auger. Accom-
panying each auger is a box or plate with a ledge on the left hand side of the
right hand auger and on the right hand side of the left hand auger. to keep
the post in its proper position while cutting the boxes or nuts. The boxes or
plates serve as guides to the augers and must be so made as to cause each
auger to commence cutting at the same point. The specific new and
useful improvements herein before described and claimed by me as the in
ventor are the following; First the cast iron augers with the cutters dovetailed
into the same. Second the boxes or plates accompanying the augers. Third
the caps upon the screw tools to regulate the cutting of the screw. Fourth
the standards or head block and heel block with the screws attached to
the same. By means of these improvements the screws in the ends of
the rails and the nuts or boxes in the posts are always cut uniform. so that
the bedstead will in all cases come together with close joints Witnesses Ira Bellows Exd. John Sutherland ch'd W.

Aaron Stedman

7/14 h.8.

(Patented 16 January 1835)
(Drawing made.)

(Drawing).